United States Patent

Annis et al.

[15] 3,669,931
[45] June 13, 1972

[54] POLYETHYLENE TEREPHTHALATE FILMS CONTAINING HYDRATED ALUMINUM SILICATE FOR LESS SHRINKAGE AND ABRASION

[72] Inventors: Darrell D. Annis, Taylors; Keith D. Dodson, Greenville; Paul M. Sykes, Taylors, all of S.C.

[73] Assignee: Celanese Corporation, New York, N.Y.

[22] Filed: July 7, 1970

[21] Appl. No.: 53,025

[52] U.S. Cl. .................................. 260/75 R, 161/231, 161/402, 260/40 R, 264/210 R
[51] Int. Cl. .................... B32b 27/20, B32b 27/36, D01f 7/06
[58] Field of Search ................. 161/165, 231; 264/210 R; 260/75 SB, 75 R, 40 R

[56] References Cited

UNITED STATES PATENTS 3,138,517    6/1964    Charbonneau .................... 161/231 X
3,515,626    6/1970    Duffield ............................ 161/231 X

FOREIGN PATENTS OR APPLICATIONS 610,137    10/1948    Great Britain ........................ 161/231

OTHER PUBLICATIONS

Grant, Julius, "A Laboratory Handbook of Pulp and Paper Manufacture," Longmans Green & Co., 1942 New York City, frontispiece and pages 115, 116.
" Modern Plastics Encyclopedia" 1967, the September issue of Modern Plastics, 1966, Vol. 44, No. 1A, McGraw-Hill New York City, frontispiece and pages 590, 591, 592.

Primary Examiner—Robert F. Burnett
Assistant Examiner—C. B. Cosby
Attorney—Thomas J. Morgan and Linn I. Grim

[57] ABSTRACT

A polyethylene terephthalate film is produced having improved abrasion resistance and low shrinkage properties by the dispersing in the film of hydrated aluminum silicate. The improved film has a coefficient of friction in the range of 0.3 to about 1.0 and the hydrated silica ranges from 0.01 percent to about 0.5 percent by weight of the polymer and has a particle size from about 300 to 1000 millimicrons. The film has an intrinsic viscosity of 0.2 to about 1.0 and after biaxially stretching is heated at 215° C. − 235° C. for a period of time to complete crystallization.

6 Claims, No Drawings

POLYETHYLENE TEREPHTHALATE FILMS CONTAINING HYDRATED ALUMINUM SILICATE FOR LESS SHRINKAGE AND ABRASION

This invention relates to an improved polyethylene terephthalate film and to the method for producing these improved films.

In the production of polyethylene terephthalate films for use as tapes, it is essential that these films have out-standing stability properties for extensive use and long life. In the use of these tapes, considerable physical contact of the tape is made on the equipment and the physical contact causes the tape to abrade and significantly decreases the useful life of the tape. In the manufacture of tapes, especially magnetic tapes, high temperatures are required in the various coating procedures needed. These high temperatures tend to shrink the film base in a manner which is not controllable to provide a non-uniform tape product which can undesirably distort the final use of the tapes. In order to provide superior tapes, it is therefore desirable to provide a polyethylene terephthalate base film which not only has a minimum shrinkage capability but also has outstanding abrasion resistance properties as well as other desirable properties.

By this invention, a biaxially oriented polyethylene terephthalate film is provided which has the unique and highly desirable combination of outstanding abrasion resistance coupled with a maximum shrinkage value in the planar dimension of 1.5% when heated at 150° C. for a maximum of 30 minutes. The film of this invention has an intrinsic viscosity in the range from about 0.2 to about 1.0 deciliters per gram and a coefficient of friction in the range from about 0.3 to about 1.0. Completely dispersed throughout the film are particles of hydrated aluminum silicate having an average particle size ranging from about 300 to about 1,000 millimicrons.

A further aspect of this invention is the method of forming an improved polyethylene terephthalate film having the properties described above by initially dispersing substantially completely within the polyethylene terephthalate polymer hydrated aluminum silicate, and extruding a film from the polymer. The film is biaxially stretched to provide strength at a temperature in the range from about the second order transition temperature of the polymer to below the temperature at which the polymer softens and melts. The film is then heated at temperatures in the range from about 215° C. to about 240° C. for a period of time sufficient to complete substantially crystallization of the film. The film has an outstanding abrasion resistance and low shrinkage properties.

The improved films of this invention are formed from polymers produced from the reaction product of terephthalic acid or a dialkyl ester of terephthalic acid (especially dimethyl terephthalate) with ethylene glycol. In the manufacture of these polymers, bis(hydroxyethyl)terephthalate is produced as an intermediate and this intermediate can be prepared by at least two different methods. One method for producing bis(hydroxyethyl)terephthalate by the direct esterification of terephthalic acid and ethylene glycol is described in U.S. Pat. No. 3,050,533. In this method the by-product of the reaction is water which is distilled from the reaction product. The other method for producing bis(hydroxyethyl)terephthalate, is the transesterification reaction of a dialkyl ester of terephthalic acid (especially dimethyl terephthalate) with at least about two molecular proportions of ethylene glycol per molecular proportion of dialkyl terephthalate. It is preferred to use higher proportions of ethylene glycol i.e. in excess of two molecular proportions per molecular proportion of the dialkyl terephthalate since under these conditions, the initial transesterification is caused to take place more rapidly and completely. The reaction for the transesterification is conducted under conditions of elevated temperatures (from about the boiling temperature of the reaction mixture to as high as 250° C.) and at atmospheric, subatmospheric or superatmospheric pressures. The by-product of the transesterification reaction is an alkanol, for example, if dimethyl terephthalate is used, methanol is removed. Many known catalysts can be used to speed the transesterification reaction.

After the bis(hydroxyethyl)terephthalate has been produced, it is converted to polyethylene terephthalate polymer by heating to a temperature above the boiling point of ethylene glycol or reaction mixture under conditions effecting removal of the glycol or water and to temperatures as high as 325° C., if desired. It is essential in obtaining the desired polymerized product that during the heating or during part of the heating, the pressure is reduced so as to provide rapid distillation of the excess glycol or water. The pressure may be reduced in successive stages so that the heating begins at normal pressure, is continued at a reduced pressure and is completed at a further reduced pressure. Pressures in the range from about 1 to 10 millimeters are preferred. The materials used as catalysts in the esterification reaction may also be present as a catalyst in the polymerization reaction. The preferred polymerization catalysts are the antimony compounds such as antimony trioxide, antimonic acid and the like to accelerate conversion of the bis(hydroxyethyl)terephthalate to polyethylene terephthalate polymer having an intrinsic viscosity as measured in ortho-chlorophenol in excess of 0.2 deciliters per gram, preferably ranging from about 0.4 to about 1.0 deciliters per gram, for further processing into useful films of this invention.

The heating of the polymerization reaction is conducted under conditions to prevent oxidation, i.e., any presence of oxygen should be avoided, and a slow stream of an inert gas, for example nitrogen, carbon dioxide and the like can be passed through or over the molten mass. During the heating and polymerization, viscosity of the melt gradually increases; the temperature must be maintained high enough to keep the mass in the molten state during the entire heating period. The heating is continued at least until a film can be formed from the melt which possesses the desired properties and the melting point of the polymerized product exceeds about 240° C., preferably exceeding 250° C. After the heating is completed the product may be utilized to produce films or otherwise removed from the reaction vessel in molten form and formed into blocks, chips, and the like for further use.

Within the polyethylene terephthalate polymers described above is incorporated the substantially completely dispersed hydrated aluminum silicate particles into the initial reacting materials of bis(hydroxyethyl)terephthalate or incorporated into the bis(hydroxyethyl)terephthalate itself. It is essential, however, that the dispersion of the particles be maintained throughout the polymer. A suitable way of completely dispersing the particles is by adding the glycol to the particles and exposing the mixture to ultrasonic vibrations. The hydrated aluminum silicate ($Al_2O_3 \cdot SiO_2 \cdot H_2O$) used herein contains chemically combined water within the structure (as high as 20 percent water) as opposed to no water contained in calcined aluminum silicate. The amount of hydrated aluminum silicate in the polymer can range from about 0.01 percent to about 0.5 percent preferably from about 0.05 percent to about 0.3 percent by weight based on the total polymer. The average particle size of the hydrated aluminum silicate can range from about 300 to about 1,000 millimicrons, preferably from about 400 to 600 millimicrons. The term "average particle size" is defined as is known in the art as the volume of particle equal to the volume of a sphere of known cross-sectional area. The average particle size is expressed as equivalent spherical diameter and designated in millimicrons for purposes of this invention. Average particle size is measured by X-ray sedimentation analysis on a commercially available instrument such as the Micromeritics Model 5000 Particle Size Analyzer.

After the polyethylene terephthalate polymer containing particles of hydrated aluminum silicate has been produced, the polymer is extruded on polished revolving casting drums and biaxially stretched i.e. forward and lateral stretching in either order or simultaneously to impart strength and toughness to the film. The amount of stretching can range from about 2.5 to about 4.0 times the original dimensions, preferably in the range from 2.8 to about 3.8 times the original dimensions. The stretching operation is carried out at temperatures in the range from about the second order transition temperature and below the temperature at which the polymer softens and melts. The method of forming the film can be carried out by the use of conventional tensilizing equipment which consistently produces a uniform product.

After the film has been stretched, the film is heat treated to complete substantially the crystallization of the polymer in the film and provide stability to the film. The temperatures used for heat treatment can range from about 210° C. to about 240° C. preferably about 215° C. to about 235° C. The time required for heating the film must be sufficient to complete substantially the crystallization of the polymer which can range from a minute (fraction of second) period of time to extended periods (several minutes to hours if necessary). Temperatures in the heat treatment ranges described above provide films which have superior shrinkage properties having a maximum value in planar dimensions of 1.5 percent. The shrinkage value is determined by the measurement of the shrinking of a predetermined planar portion of the film heated at 150° C. for a maximum time of 30 minutes i.e. if a film 100 inches wide shrinks 1 inch in width under the conditions of heating, the width shrinkage is 1 percent. Another measurement can be taken in the length direction. The shrinkage value of the films of this invention do not exceed 1.5 percent in any direction.

The unique feature of the film of this invention is that the presence of hydrated aluminum silicate particles within the film provides improved abrasion resistance coupled with low shrinkage properties and a coefficient of friction of the film ranging from about 0.03 to about 1.0 providing excellent slip characteristics. As will be demonstrated in the examples below, if calcined aluminum silicate particles are used under the conditions described hereinbefore good film properties can be obtained but the abrasion resistance of the film cannot be considered satisfactory for a tape base.

The following Examples will serve to illustrate the invention without limiting the same.

EXAMPLE 1

In a reaction vessel, 3,500 pounds of dimethyl terephthalate and 2,600 pounds of ethylene glycol are placed. This mixture is heated to 150° C. To the mixture is added 3.5 pounds hydrated aluminum silicate containing 13.8 percent chemically combined water and having an average particle size diameter of 500 millimicrons, completely dispersed in 40 pounds ethylene glycol using ultrasonic vibrations. Additionally 1.7 pounds of manganese glycol oxide in 6 pounds of ethylene glycol is added to the reaction mixture. The reaction mixture is heated to 200° C. at atmospheric pressure while removing methanol from the mixture for a period of time sufficient to remove the theoretical amount of methanol produced. The temperature is gradually increased while removing the excess ethylene glycol until the temperature reaches 225° C. to form monomeric bis(2-hydroxyethyl) terephthalate. To the monomeric bis(2-hydroxyethyl) terephthalate is added 1.1 pounds trimethylphosphite dissolved in 2 pounds ethylene glycol and 1.5 pounds antimony trioxide dispersed in 6 pounds ethylene glycol. The pressure of the reaction kettle is reduced gradually from atmospheric to about 1 millimeter of pressure mercury will raising the temperature of the reaction mixture to 285° C.

During this period, ethylene glycol is removed during the polymerization and the temperature is maintained until the intrinsic viscosity of the polymers reaches about 0.4 to 0.8 deciliters per gram as measured in ortho-chlorophenol. The polymer melt is ready for film production.

EXAMPLE 2

In the same manner as Example 1, polyethylene terephthalate polymer was prepared except for the hydrated aluminum silicate, calcined aluminum silicate was substituted.

EXAMPLES 3 and 4

The polymers of Example 1 and Example 2 are extruded on a polished revolving drum to provide a 142 gauge film. The film is then subjected successively to a forward stretching and then to a lateral stretching at temperatures in the range from 100° C. to 224° C. throughout the stretching process. The film is then heat set for 30 seconds at various temperatures, cooled and wound on a mandrel. The comparative results using varying conditions are described in Table I.

TABLE I

| | | Example 3 Hydrated Aluminum Silicate | Example 4 Calcined Aluminum Silicate |
|---|---|---|---|
| Draw Ratio | Length | 3.6 | 3.6 |
| | Width | 3.8 | 3.8 |
| Heat Set Crystallization Temperatures | | 225° C. | 225° C. |
| I.V. deciliters/gram | | 0.578 | 0.565 |
| *Abrasion Mg./2600 ft. 25 Cycles | | 26.8 | 62.7 |
| Shrinkage % Planar 150° C—30 Minutes | Length | 1.3 | 1.3 |
| | Width | 1.5 | 1.5 |
| Coefficient Friction | | .36 | .38 |
| Break psi | Length | 29,900 | 30,300 |
| | Width | 32,100 | 30,900 |
| Elongation % | Length | 100 | 100 |
| | Width | 93 | 84 |
| Modulus psi | Length | 674,000 | 651,000 |
| | Width | 694,000 | 676,000 |

*Determination of Abrasion—The film is slit to one half inch width by 2600 feet and wound on a standard computer tape reel (supply reel). The tape is threaded on an Ampex TM—2 transport from the supply reel by looping in a vacuum chamber passing through a rotating capstan and capstan roller (without pulling but used as the driving force in the reverse cycle) over a read and write heads pulled over a rotating capstan and capstan roller through a loop in a second vacuum chamber and on to a take up reel. The process is reversed from take-up reel to the supply reel. This tape is shuttled 25 cycles (50 passes). The amount of abraded material generated is collected from the transport chamber and guides by a specially constructed suction system and weighed on an analytical balance. The abraded material is measured in milligrams for 2600 feet by one half inch tape.

The physical properties of the above films are highly desirable for use as a base for magnetic tape i.e. coating the film with a suitable coating material containing magnetic ferric oxide. It should be noted that the abrasion of Example 3 (hydrated aluminum silicate film) has improved more than two-fold over the calcined aluminum silicate which has an undesirable abrasion property.

EXAMPLES 5-7

In the same manner as Examples 3 and 4, Table II defines additional conditions and results.

TABLE II

| | | Ex. 5 Hydrated Aluminum Silicate | Ex. 6 Hydrated Aluminum Silicate | Ex. 7 Calcined Aluminum Silicate |
|---|---|---|---|---|
| Draw Ratio | Length | 2.9 | 2.9 | 2.9 |
| | Width | 3.2 | 3.2 | 3.2 |
| Heat Set Crystallization Temperature | | 225° C. | 205° C. | 205° C. |
| I.V. dl/g. | | 0.578 | 0.578 | 0.565 |
| Abrasion Mg./2600 ft. 25 Cycles | | 32.8 | 29.5 | 33.2 |
| Shrinkage % Planar 150° C—30 Minutes | Length | 1.2 | 1.9 | 1.8 |
| | Width | 1.2 | 1.9 | 1.7 |
| Coefficient Friction | | .4 | .4 | .38 |
| Break psi | Length | 25,300 | 29,500 | 26,300 |

|  |  |  |  |  |
|---|---|---|---|---|
| Elongation % | Width | 28,800 | 28,700 | 27,900 |
|  | Length | 147 | 140 | 122 |
|  | Width | 115 | 105 | 96 |
| Modulus | Length | 591,000 | 603,000 | 591,000 |
| psi | Width | 696,000 | 682,000 | 667,000 |

In the above examples, the calcined aluminum silicate film at a crystallization temperature of 205° C. has an abrasion equivalent to the hydrated aluminum silicate film at the same temperature but the shrinkage values are too high. Increasing the crystallization temperature to 225° C. for hydrated aluminum silicate film the shrinkage becomes acceptable and abrasion remains outstanding. Increasing the crystallization temperatures of calcined aluminum silicate film as demonstrated in Example 4 to provide the desirable shrinkage properties, the abrasion properties become unacceptable.

EXAMPLE 8-9

In the same manner as Examples 5 through 7 Table III defines additional conditions and results.

TABLE III

|  |  | Example 8 Hydrated Aluminum Silicate | Example 9 Calcined Aluminum Silicate |
|---|---|---|---|
| Draw | Length | 3.0 | 3.0 |
| Ratio | Width | 3.2 | 3.2 |
| Heat Set Crystallization Temperature |  | 215° C. | 215° C. |
| I.V. dl/g |  | .570 | .570 |
| Abrasion Mg./2600 ft. 25 Cycles |  | 32.2 | 105.7 |
| Shrinkage % Planar 150° C–30 Minutes | Length Width | 1.5 1.0 | 1.5 1.3 |
| Coefficient of Friction |  | .4 | .4 |

The remaining physical properties of the above films are similar to those of Examples 1 through 7. These Examples indicate that 215° C. crystallization treatment of the film provides outstanding abrasion properties for the film containing hydrated aluminum silicate as compared to the film containing calcined aluminum silicate. Since it has been demonstrated that 205° C. crystallization properties do not provide the adequate shrinkage properties and Examples 8 and 9 show a clear distinction of the improvements of this invention between films containing hydrated and calcined aluminum silicate, it becomes apparent that 210° C. crystallization temperatures appears to be the minimum temperatures for the production of highly acceptable films containing hydrated aluminum silicate.

It is to be understood that the foregoing description is merely illustrative and preferred embodiments of the invention of which many variations may be made by those skilled in the art within the scope of the following claims without departing from the spirit thereof.

What is claimed is:

1. A method of forming an improved polyethylene terephthalate film having a coefficient of friction in the range from about 0.3 to about 1.0 which comprises forming a polymer of polyethylene terephthalate having an intrinsic viscosity in the range from about 0.2 to about 1.0 and completely dispersing therein hydrated aluminum silicate in amounts ranging from about 0.01 percent to about 0.5 percent by weight based on the total polymer and having an average particle size ranging from about 300 to 1,000 millimicrons, extruding a film from said polymer, biaxially stretching said film at a temperature in the range from about the second order transition temperature of said polymer to below the temperature at which the polymer softens and melts and the film is heated at a temperature in the range from about 215° C. to about 235° C. for a period of time sufficient to complete substantially crystallization of the film.

2. The method of claim 1 wherein the film is biaxially stretched from about 2.5 to about 4.0 times its original dimensions.

3. The method of claim 2 wherein the hydrated aluminum silicate as dispersed ranges in amounts from about 0.05 to about 0.3 percent by weight of the total polymer.

4. The method of claim 3 wherein the intrinsic viscosity of the polymer ranges from about 0.4 to about 1.0 deciliters per gram.

5. The method of claim 4 wherein the average particle size of the hydrated aluminum silicate ranges from about 400 to about 600 millimicrons.

6. A biaxially oriented polyethylene terephthalate film made in accordance with the process of claim 1.

* * * * *

UNITED STATES PATENT OFFICE
CERTIFICATE OF CORRECTION

Patent No. __3,669,931__    Dated __June 13, 1972__

Inventor(s) __Darrell D. Annis, Keith D. Dodson & Paul M. Sykes__

It is certified that error appears in the above-identified patent and that said Letters Patent are hereby corrected as shown below:

In the specification at Column 3, line 32, "0.03" should read -- 0.3 --

In the specification at Column 3, line 64, "will" should read -- while --

In the specification at Column 4, Table I, line 14 the word "Hydrated" should be inserted directly under the words "Example 3".

In the specification, at Column 4, lines 61 and 63, the words "Aluminum" and "Silicate" should be inserted directly under the words "Example 5 Hydrated".

Signed and sealed this 2nd day of January 1973.

(SEAL)
Attest:

EDWARD M. FLETCHER, JR.
Attesting Officer

ROBERT GOTTSCHALK
Commissioner of Patents